United States Patent
Hart et al.

(10) Patent No.: US 8,702,555 B1
(45) Date of Patent: Apr. 22, 2014

(54) MULTI-SPEED TRANSMISSION WITH A SELECTABLE ONE-WAY CLUTCH

(71) Applicant: GM Global Technology Operations LLC, Detroit, MI (US)

(72) Inventors: James M. Hart, Belleville, MI (US); Daryl A. Wilton, Macomb, MI (US); James B. Borgerson, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/782,669

(22) Filed: Mar. 1, 2013

(51) Int. Cl.
  *F16H 3/66* (2006.01)
(52) U.S. Cl.
  USPC ........... 475/281; 475/278; 475/283; 475/289; 475/292; 475/324

(58) Field of Classification Search
  USPC .............. 475/278, 281, 283, 289, 292, 324
  See application file for complete search history.

(56) References Cited

U.S. PATENT DOCUMENTS

2008/0312026 A1 * 12/2008 Kim .............................. 475/286

* cited by examiner

Primary Examiner — Derek D Knight

(57) ABSTRACT

A transmission is provided having an input member, an output member, a plurality of planetary gear sets, a plurality of coupling members and a plurality of torque transmitting devices. One of the plurality of torque transmitting devices is an integrated friction launch clutch. A one-way clutch is in series relationship with the launch clutch and is configured to disconnect the launch clutch from at least one of the plurality of planetary gear sets. The torque transmitting devices include clutches and brakes actuatable in combinations of two to establish at least ten forward gear ratios and one reverse gear ratio.

20 Claims, 2 Drawing Sheets

| GEAR STATE | GEAR RATIO | RATIO STEP | TORQUE TRANSMITTING ELEMENTS ||||||
|---|---|---|---|---|---|---|---|---|
| | | | 32 | 30 | 34 | 36 | 28 | 26 |
| REV | -2.870 | | X | | | | | X |
| N | | -0.64 | | | | | | |
| 1ST | 4.455 | | X | | X | | | |
| 2ND | 2.912 | 1.53 | | X | X | | | |
| 3RD | 1.894 | 1.54 | | | X | | | X |
| 4TH | 1.446 | 1.31 | | | X | | X | |
| 5TH | 1.000 | 1.45 | | | | | X | X |
| 6TH | 0.851 | 1.18 | X | | | X | | |
| 7TH | 0.742 | 1.15 | | X | | | X | |
| 8TH | 0.609 | 1.22 | | | | X | X | |
| 9TH | 0.556 | 1.09 | | X | | X | | |
| 10TH | 0.505 | 1.10 | | | | X | | X |

X = ON - ENGAGED CARRYING TORQUE
O = ON - ENGAGED NOT CARRYING TORQUE

FIG. 3

MULTI-SPEED TRANSMISSION WITH A SELECTABLE ONE-WAY CLUTCH

FIELD

The invention relates generally to a multiple speed transmission having a plurality of planetary gear sets and a plurality of torque transmitting devices with a selectable one-way clutch. More particularly the invention relates to a transmission having a selectable one-way clutch in series relationship with an integrated friction launch device.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided that includes an input member, an output member, and first, second, third and fourth planetary gear sets each having first, second and third members. A first interconnecting member continuously interconnects the first member of the first planetary gear set with the second member of the second planetary gear set. A second interconnecting member continuously interconnects the second member of the first planetary gear set with the third member of the third planetary gear set. A third interconnecting member continuously interconnects the third member of the first planetary gear set with the third member of the fourth planetary gear set. A fourth interconnecting member continuously interconnects the first member of the second planetary gear set with the second member of the fourth planetary gear set. A fifth interconnecting member continuously interconnects the third member of the second planetary gear set with the second member of the third planetary gear set. The transmission also includes six torque transmitting mechanisms each selectively engageable to interconnect at least one of the first, second, and third members with at least one other of the first, second, third members and a stationary member, wherein one of the six torque transmitting mechanisms is a launch device engaged in first gear and reverse gear. A one-way clutch is in series relationship with the launch device and is configured to connect the launch device with the stationary member when the launch device is engaged and is configured to disconnect the launch device from the stationary member when the launch device is disengaged. The six torque transmitting mechanisms are selectively engageable in combinations of at least two to establish at least ten forward speed ratios and at least one reverse speed ratio between the input member and the output member.

In one embodiment a first of the six torque transmitting mechanisms is selectively engageable to interconnect the first member of the third planetary gear set with the input member, the first member of the second planetary gear set and the second member of the fourth planetary gear set.

In another embodiment a second of the six torque transmitting mechanisms is selectively engageable to interconnect the third member of the second planetary gear set and the second member of the third planetary gear set with the input member, the first member of the second planetary gear set and the second member of the fourth planetary gear set.

In yet another embodiment a third of the six torque transmitting mechanisms is selectively engageable to interconnect the first member of the third planetary gear set with the stationary member.

In yet another embodiment a fourth of the six torque transmitting mechanisms is selectively engageable to interconnect the second member of the third planetary gear set and the third member of the second planetary gear set with the one-way clutch.

In yet another embodiment a fifth of the six torque transmitting mechanisms is selectively engageable to interconnect the third member of the first planetary gear set and the third member of the fourth planetary gear set with the stationary member.

In yet another embodiment a sixth of the six torque transmitting mechanisms is selectively engageable to interconnect the first member of the fourth planetary gear set with the stationary member.

In yet another embodiment the fourth torque transmitting mechanism is the launch device.

In yet another embodiment the input member is continuously connected for common rotation with the first member of the second planetary gear set and the second member of the fourth planetary gear set and wherein the input member is not connected to a hydrodynamic starting device.

In yet another embodiment the output member is continuously connected for common rotation with the second member of the first planetary gear set and to third member of the third planetary gear set.

In yet another embodiment the third member of the first planetary gear set, the third member of the fourth planetary gear set, the first member of the second planetary gear set and the first member of the third planetary gear set are sun gears, the second members of the first, second, third and fourth planetary gear sets are carrier members and the first member of the first planetary gear set, the first member of the fourth planetary gear set, the third member of the second planetary gear set and the third member of the third planetary gear set are ring gears.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting devices in each of the available forward and reverse speeds or gear ratios of the transmissions illustrated in FIGS. 1 and 2.

DETAILED DESCRIPTION

The following description is merely exemplary in nature and is not intended to limit the present disclosure, application, or uses.

Figure 1:
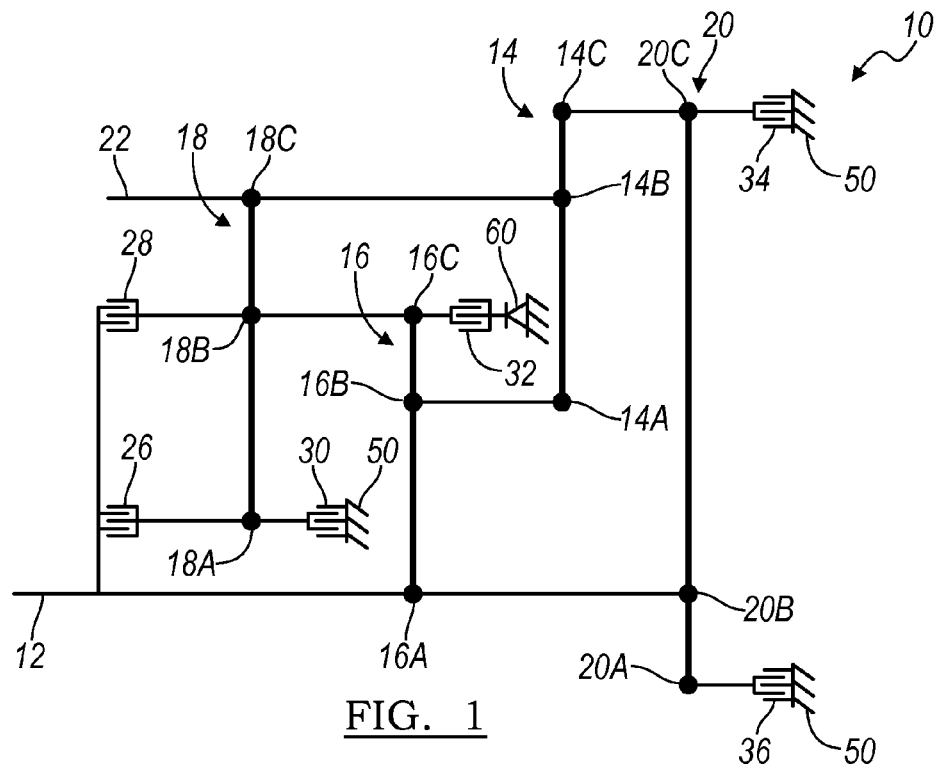
FIG. 1 is a lever diagram of an embodiment of an exemplary ten speed transmission according to the principles of the present invention.

Referring now to FIG. 1, an embodiment of a transmission 10 having an integrated friction launch device with a selectable one-way clutch is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18 and a fourth planetary gear set 20 and an output shaft or member 22. In the lever diagram of FIG. 1, the first planetary gear set 14 has three nodes: a first node 14A, a second node 14B and a third node 14C. The second planetary gear set 16 has three nodes: a first node 16A, a second node 16B and a third node 16C. The third planetary gear set 18 has three nodes: a first node 18A, a second node 18B and a third node 18C. The fourth planetary gear set 20 has three nodes: a first node 20A, a second node 20B and a third node 20C.

The input member 12 is continuously coupled to the first node 16A of the second planetary gear set 16 and the second node 20B of the fourth planetary gear set 20. The output member 22 is coupled to the third node 18C of the third planetary gear set 18 and the second node 14B of the first planetary gear set 14. The first node 14A of the first planetary gear set 14 is coupled to the second node 16B of the second planetary gear set 16. The third node 14C of the first planetary gear set 14 is coupled to the third node 20C of the fourth planetary gear set 20. The third node 16C of the second planetary gear set 16 is coupled to second node 18B of the third planetary gear set 18.

A first clutch 26 selectively connects the input member or shaft 12, the first node 16A of the second planetary gear set 16 and the second node 20B of the fourth planetary gear set 20 with the first node 18A of the third planetary gear set 18. A second clutch 28 selectively connects the input member or shaft 12, the first node 16A of the second planetary gear set 16 and the second node 20B of the fourth planetary gear set 20 with the second node 18B of the third planetary gear set 18. A first brake 30 selectively connects the first node 18A of the third planetary gear set 18 with a stationary member or transmission housing 50. A second brake 32 selectively connects the third node 16C of the second planetary gear set 16 and the second node 18B of the third planetary gear set 18 with a selectable one-way clutch 60. A third brake 34 selectively connects the third node 14C of the first planetary gear set 14 and the third node 20C of the fourth planetary gear set 20 with the stationary member or transmission housing 50. A fourth brake 36 selectively connects the first node 20A of the fourth planetary gear set 20 with the stationary member or transmission housing 50.

One of the plurality of clutches 26, 28 and brakes 30, 32, 34, and 36 is configured as a launch clutch. In the transmission example provided, the second brake 32 is preferably selected as the launch clutch. The launch clutch 32 may be modified to increase durability, size, etc., in order to function as a friction launch clutch. The friction launch clutch 32 allows the input 12 to be connected directly (i.e. not through a starting device such as a torque converter) to the output of the engine. When starting the vehicle from rest in first gear the launch clutch 32 is allowed to slip (by not being fully engaged). To launch the vehicle the launch clutch 32 is fully engaged. When the vehicle is at rest and shifted into reverse the launch clutch 32 is allowed to slip until the launch clutch 32 is fully engaged and the vehicle is launched in reverse.

Due to the larger size of the launch device 32, the spin losses associated with the launch device 32 are relatively higher than the spin losses associated with the other torque transmitting devices. Therefore, the selectable one-way clutch (SOWC) 60 is in operative association with the launch clutch 32. The SOWC 60 is disposed between the launch clutch 32 and the housing 50. The SOWC 60 includes a passive "locked" mode in one rotational direction and a "freewheel" mode in the opposite rotational direction. The "freewheel" mode may be selectively locked such that the SOWC 60 is locked in both rotational directions. The SOWC 60 minimizes the spin losses associated with the launch clutch 32.

Figure 2:
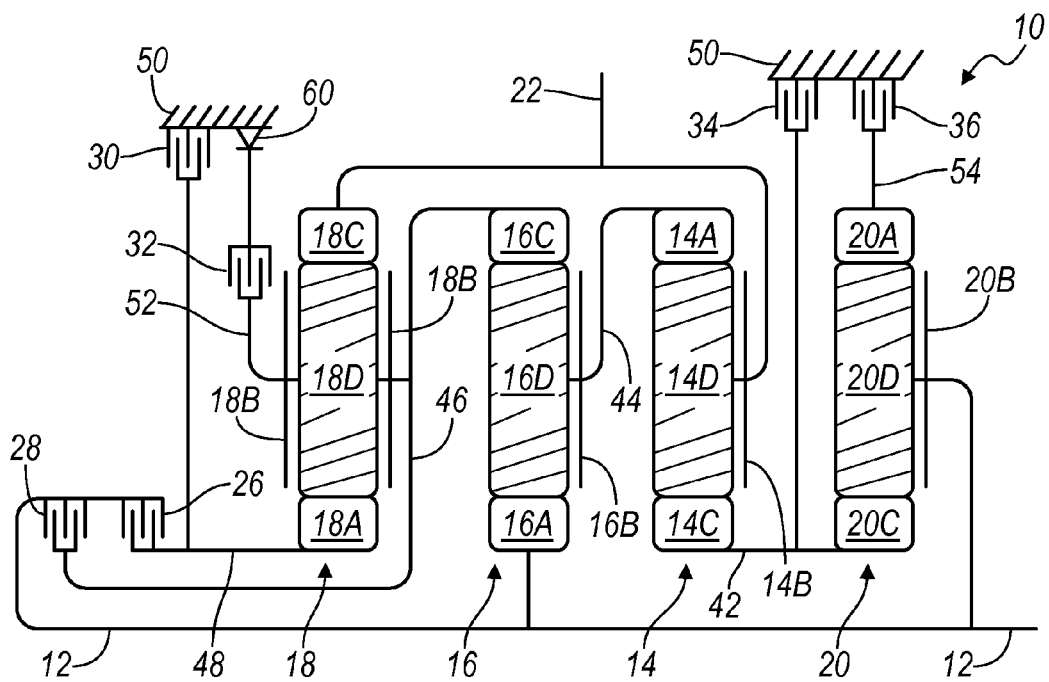
FIG. 2 is a diagrammatic illustration of an embodiment of an exemplary ten speed transmission according to the principles of the present invention.

Referring now to FIG. 2, a stick diagram presents a schematic layout of an embodiment of the ten speed transmission 10 having the launch clutch 32 and SOWC 60 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14C, a ring gear member 14A and a planet gear carrier member 14B that rotatably supports a set of planet gears 14D (only one of which is shown). The sun gear member 14C is connected for common rotation with a first shaft or interconnecting member 42. The ring gear member 14A is connected for common rotation with a second shaft or interconnecting member 44. The planet carrier member 14B is connected for common rotation with the output shaft or member 22. The planet gears 14D are each configured to intermesh with both the sun gear member 14C and the ring gear member 14A.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with the input shaft or member 12. The ring gear member 16C is connected for common rotation with a third shaft or interconnecting member 46. The planet carrier member 16B is connected for common rotation with the second shaft or interconnecting member 44. The planet gears 16D are each configured to intermesh with both the sun gear member 16A and the ring gear member 16C.

The planetary gear set 18 includes a sun gear member 18A, a ring gear member 18C and a planet gear carrier member 18B that rotatably supports a set of planet gears 18D (only one of which is shown). The sun gear member 18A is connected for common rotation with a fourth shaft or interconnecting member 48. The ring gear member 18C is connected for common rotation with the output shaft or member 22. The planet carrier member 18B is connected for common rotation with the third shaft or interconnecting member 46 and a fifth shaft or interconnecting member 52. The planet gears 18D are each configured to intermesh with both the sun gear member 18A and the ring gear member 18C.

The planetary gear set 20 includes a sun gear member 20C, a ring gear member 20A and a planet gear carrier member 20B that rotatably supports a set of planet gears 20D (only one of which is shown). The sun gear member 20C is connected for common rotation with the first shaft or interconnecting member 42. The ring gear member 20A is connected for common rotation with a sixth shaft or interconnecting member 54. The planet carrier member 20B is connected for common rotation with the input shaft or member 12. The planet gears 20D are each configured to intermesh with both the sun gear member 20C and the ring gear member 20A.

The input shaft or member 12 is continuously connected to an engine 51. The output shaft or member 22 is continuously connected with the final drive unit or transfer case (not shown).

The torque-transmitting mechanisms or clutches 26, 28 and brakes 30, 32, 34 and 36 allow for selective interconnection of the shafts or interconnecting members, members of the planetary gear sets and the housing. For example, the first clutch 26 is selectively engageable to connect the input shaft or member 12 with the fourth shaft or interconnecting member 48. The second clutch 28 is selectively engageable to connect the input shaft or member 12 with the third shaft or interconnecting member 46. The first brake 30 is selectively engageable to connect the fourth shaft or interconnecting member 48 with the stationary element or the transmission housing 50 in order to restrict the member 48 from rotating relative to the transmission housing 50. The second brake or launch clutch 32 is selectively engageable to connect the fifth shaft or interconnecting member 52 with the SOWC 60. The third brake 34 is selectively engageable to connect the first shaft or interconnecting member 42 with the stationary element or the transmission housing 50 in order to restrict the member 42 from rotating relative to the transmission housing 50. The fourth brake 36 is selectively engageable to connect the sixth shaft or interconnecting member 54 with the stationary element or the transmission housing 50 in order to restrict the member 54 from rotating relative to the transmission housing 50.

Referring now to FIG. 1 and FIG. 2, the operation of the embodiment of the ten speed transmission 10 will be described. It will be appreciated that transmission 10 is capable of transmitting torque from the input shaft or member 12 to the output shaft or member 22 in at ten forward speed torque ratios and at least one reverse speed or torque ratio. Each forward and reverse speed or torque ratio is attained by engagement of one or more of the torque-transmitting mechanisms (i.e. first clutch 26, second clutch 28, first brake 30, second brake or launch clutch 32, third brake 34 and fourth brake 36), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

During forward launch of the vehicle from a park mode to a first forward gear, the brake 34 is engaged and the launch clutch 32 is slipped (i.e. partially engaged) while the SOWC 60 is engaged and prevents a negative speed rotation of the second node 18B of the third planetary gear set and the third node 16C of the second planetary gear set 16. To establish first gear the launch clutch 32 is fully engaged with the brake 34 while the SOWC 60 continues to prevent negative speed rotation. During a first gear to second gear power-on up-shift, brake 30 is engaged and the SOWC 60 passively releases as the launch clutch 32 is disengaged. It should be appreciated that a freewheeler shift is possible and it should be appreciated that the SOWC 60 could be activated or engaged in preparation for a coast downshift. The transmission 10 includes a direct drive gear at fifth gear wherein the clutches 26 and 28 are engaged to establish fifth gear. During a fifth gear to sixth gear power-on up-shift, brake 36 is engaged and the launch clutch slips while the SOWC 60 seats. Next, the SOWC 60 remains seated and the launch clutch 32 is locked or fully engaged. To establish sixth gear, the SOWC 60 remains engaged to prevent negative speed rotation. During a sixth gear to seventh gear power-on up-shift, brake 30 is engaged while the SOWC 60 lifts or disengages. During seventh gear the SOWC 60 freewheels thus reducing slip losses through the launch clutch 32. The SOWC 60 may be activated in preparation for a coast downshift. Likewise, the other gears (reverse, third, fourth, eighth, ninth, tenth) are achieved through different combinations of clutch and brake engagement, as shown in FIG. 4.

It will be appreciated that the foregoing explanation of operation and gear states of the ten speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The invention claimed is:

1. A powertrain comprising:
  an engine; and
  a ten-speed transmission including:
    an input member connected to the engine;
    an output member;
    a plurality of planetary gear sets connected between the input member and the output member;
    a launch clutch connected to one of the plurality of planetary gear sets, wherein the launch clutch is configured to engage during a first gear and a reverse gear; and a one-way clutch connected between the launch clutch and a stationary member, wherein the one-way clutch is configured to couple the launch clutch with the stationary member when the launch clutch is engaged and to disconnect the launch clutch with the stationary member when the launch clutch is not engaged.

2. The powertrain of claim 1 wherein the input member of the transmission is not connected to a hydrodynamic starting device disposed between the engine and the input member.

3. The powertrain of claim 1 wherein the transmission includes five torque transmitting devices, and wherein engagement of the launch clutch, the one-way clutch, and a first of the five torque transmitting devices provides the first gear.

4. The powertrain of claim 3 wherein engagement of the launch clutch, the one-way clutch, and a second of the five torque transmitting devices provides the reverse gear.

5. A transmission including:
an input member;
an output member;
first, second, third and fourth planetary gear sets each having first, second and third members;
a first interconnecting member continuously interconnecting the first member of the first planetary gear set with the second member of the second planetary gear set;
a second interconnecting member continuously interconnecting the second member of the first planetary gear set with the third member of the third planetary gear set;
a third interconnecting member continuously interconnecting the third member of the first planetary gear set with the third member of the fourth planetary gear set;
a fourth interconnecting member continuously interconnecting the first member of the second planetary gear set with the second member of the fourth planetary gear set;
a fifth interconnecting member continuously interconnecting the third member of the second planetary gear set with the second member of the third planetary gear set;
six torque transmitting mechanisms each selectively engageable to interconnect at least one of the first, second, and third members with at least one other of the first, second, third members and a stationary member, wherein one of the six torque transmitting mechanisms is a launch device engaged in first gear and reverse gear; and
a one-way clutch in series relationship with the launch device and configured to connect the launch device with the stationary member when the launch device is engaged and configured to disconnect the launch device from the stationary member when the launch device is disengaged, and
wherein the six torque transmitting mechanisms are selectively engageable in combinations of at least two to establish at least ten forward speed ratios and at least one reverse speed ratio between the input member and the output member.

6. The transmission of claim 5 wherein a first of the six torque transmitting mechanisms is selectively engageable to interconnect the first member of the third planetary gear set with the input member, the first member of the second planetary gear set and the second member of the fourth planetary gear set.

7. The transmission of claim 6 wherein a second of the six torque transmitting mechanisms is selectively engageable to interconnect the third member of the second planetary gear set and the second member of the third planetary gear set with the input member, the first member of the second planetary gear set and the second member of the fourth planetary gear set.

8. The transmission of claim 7 wherein a third of the six torque transmitting mechanisms is selectively engageable to interconnect the first member of the third planetary gear set with the stationary member.

9. The transmission of claim 8 wherein a fourth of the six torque transmitting mechanisms is the launch clutch and is selectively engageable to interconnect the second member of the third planetary gear set and the third member of the second planetary gear set with the one-way clutch.

10. The transmission of claim 9 wherein a fifth of the six torque transmitting mechanisms is selectively engageable to interconnect the third member of the first planetary gear set and the third member of the fourth planetary gear set with the one-way clutch.

11. The transmission of claim 10 wherein a sixth of the six torque transmitting mechanisms is selectively engageable to interconnect the first member of the fourth planetary gear set with the stationary member.

12. The transmission of claim 11 wherein the fourth torque transmitting mechanism is the launch device.

13. The transmission of claim 5 wherein the input member is continuously connected for common rotation with the first member of the second planetary gear set and the second member of the fourth planetary gear set and wherein the input member is not connected to a hydrodynamic starting device.

14. The transmission of claim 5 wherein the output member is continuously connected for common rotation with the second member of the first planetary gear set and to third member of the third planetary gear set.

15. The transmission of claim 5 wherein the third member of the first planetary gear set, the third member of the fourth planetary gear set, the first member of the second planetary gear set and the first member of the third planetary gear set are sun gears, the second members of the first, second, third and fourth planetary gear sets are carrier members and the first member of the first planetary gear set, the first member of the fourth planetary gear set, the third member of the second planetary gear set and the third member of the third planetary gear set are ring gears.

16. A transmission comprising:
first, second, third and fourth planetary gear sets each having a sun gear, a carrier member and a ring gear;
an input member continuously connected for common rotation with the sun gear of the second planetary gear set and the carrier member of the fourth planetary gear set;
an output member continuously connected for common rotation with the carrier member of the first planetary gear set and the ring gear of the third planetary gear set;
a first interconnecting member continuously interconnecting the ring gear of the first planetary gear set with the carrier member of the second planetary gear set;
a second interconnecting member continuously interconnecting the carrier member of the first planetary gear set with the ring gear of the third planetary gear set;
a third interconnecting member continuously interconnecting the sun gear of the first planetary gear set with the sun gear of the fourth planetary gear set;
a fourth interconnecting member continuously interconnecting the sun gear of the second planetary gear set with the carrier member of the fourth planetary gear set;
a fifth interconnecting member continuously interconnecting the ring gear of the second planetary gear set with the carrier member of the third planetary gear set;

a first torque transmitting mechanism selectively engageable to interconnect the sun gear of the third planetary gear set with the input member, the sun gear of the second planetary gear set and the carrier member of the fourth planetary gear set;

a second torque transmitting mechanism selectively engageable to interconnect the ring gear of the second planetary gear set and the carrier member of the third planetary gear set with the input member, the sun gear of the second planetary gear set and the carrier member of the fourth planetary gear set;

a third torque transmitting mechanism selectively engageable to interconnect the sun gear of the third planetary gear set with the stationary member;

a fourth torque transmitting mechanism selectively engageable to interconnect the carrier member of the third planetary gear set with the stationary member;

a fifth torque transmitting mechanism selectively engageable to interconnect the sun gear of the first planetary gear set and the sun gear of the fourth planetary gear set with the stationary member; and a sixth torque transmitting mechanism selectively engageable to interconnect the ring gear of the fourth planetary gear set with the stationary member;

a seventh torque transmitting mechanism selectively engageable to interconnect the fourth torque transmitting mechanism with the stationary member, and wherein the torque transmitting mechanisms are each selectively engageable in combinations of at least two to establish at least ten forward speed ratios and at least one reverse speed ratio between the input member and the output member.

17. The transmission of claim 16 wherein the fourth torque transmitting mechanism is engaged in a first gear and a reverse gear.

18. The transmission of claim 17 wherein the seventh torque transmitting mechanism connects the fourth torque transmitting mechanism with the stationary member when the fourth torque transmitting mechanism is engaged and disconnects the fourth torque transmitting mechanism from the stationary member when the fourth torque transmitting mechanism is disengaged.

19. The transmission of claim 18 wherein the seventh torque transmitting mechanism is a selectable one-way clutch.

20. A powertrain comprising:
an engine; and
a transmission including:
an input member connected to the engine;
an output member;
a plurality of planetary gear sets connected between the input member and the output member;
a launch clutch connected to one of the plurality of planetary gear sets, wherein the launch clutch is configured to engage during a first gear and a reverse gear; and
a one-way clutch disposed in series between the launch clutch and a stationary member, wherein the one-way clutch is configured to couple the launch clutch with the stationary member when the launch clutch is engaged and to disconnect the launch clutch with the stationary member when the launch clutch is not engaged.

* * * * *